United States Patent Office 2,762,942
Patented Sept. 11, 1956

2,762,942

APERTURED MASK

Earl W. Palmer, Watertown, Conn., assignor to The American Brass Company, a corporation of Connecticut No Drawing. Application December 22, 1954, Serial No. 477,135

4 Claims. (Cl. 313—86)

This invention relates to the manufacture of apertured masks, and to the provision of an alloy for the manufacture of such masks which possesses suitable characteristics for the production of perforate patterns by photoengraving processes. More particularly, the invention is directed to the production of aperture masks for color television receiving tubes.

The aperture mask is an essential element of the three-gun color television receiving tubes ("picture tubes") commercially manufactured up to the present time, and consists of a perforated metal screen placed just behind the phosphor plate (which may be the face of the tube). The round holes in the aperture mask, of which there may be approximately 2,000 per sq. in., are precisely positioned on the mask and the mask is so aligned with the phosphor plate, which carries a pattern of triads of red, blue and green phosphor dots, that an electron beam from the "red" electron gun, for example, will on passing through the holes in the aperture mask strike and excite only red phosphor dots. In similar fashion and through the same holes, the electron beam from the "blue" gun can see and excite only blue phosphor dots, and the electron beam from the "green" gun can see and excite only green phosphor dots.

Up to the time of the present invention, a wide variety of materials for making aperture masks had been studied and evaluated. The requirements are extraordinarily complex and exacting. First of all the material must be one that can be etched with extreme uniformity in the photoengraving process (generally involving a ferric chloride etch) used for producing the pattern of precisely positioned uniform holes. It must be a material that can be produced in wide widths (currently up to 24 inches) in gauges of the order of .0035 to .010 inch. (Thicker gauges would result in interference with the desired shape of the transmitted electron beam.) The material must have sufficient strength to be rigidly self-supporting in the picture tube even at baking-out temperatures that may exceed 400° C., and during a long service life at temperatures in the neighborhood of 100° C. It must have sufficient ductility to be pressed, after the holes are formed, into a cylindrical or spherical dome-shaped (dished) structure, and the ductility must be so uniform in all directions that this may be accomplished without disturbing the relative positions of the holes. The material should be preferably nonmagnetic, since any permanent magnetism associated with the aperture mask might result in undesired deflection of the electron beam. The material must be free from volatile constituents (such as zinc, cadmium, etc.) that might "poison" the tube during outgassing at elevated temperatures, or might be slowly released at normal operating temperatures and limit the life of the tube. The material must not form unstable films when exposed to the atmosphere—for example, the hydrated iron oxides (rust) that form on ferrous materials would make a tube containing an aperture mask of such material very difficult to outgas. The material must be readily attached to supporting structures and accessories, preferably by spot welding. Further desirable characteristics are a low coefficient of expansion, susceptibility to blackening as by oxide film formation to improve heat radiation characteristics, and, of course, as low a cost as possible consistent with attaining the above characteristics.

In the early days of commercial color television receiving tube production, a systematic survey of available commercial materials resulted in the selection of 70/30 cupro-nickel (70% by weight copper, 30% by weight nickel) as the material most promising for further development work to attain the desired characteristics. In all respects save etching characteristics, this material was ideally suited to the physical requirements of this application, and a large number of tubes have been made with aperture masks of this alloy. However, such tubes, while reasonably satisfactory for receiving color, show unpleasant color mottling when receiving black and white, and this mottled appearance is due to variation in the size and shape of holes in the aperture mask. Despite numerous attempts under wide variations of casting and fabricating processes, involving making castings of various sizes in various types of molds, and rolling and annealing such castings under conditions especially selected to improve the homogeneity of the material, it has not been found possible to produce thin 70/30 cupro-nickel strip of sufficient uniformity of structure to permit aperture masks of the required uniformity of hole size and spacing to be produced. The dendritic segregation of the casting, even under the most favorable casting and fabricating conditions, persists to some extent in the finished product, and nonuniformity of etching can be directly related to the nonuniformity of microstructure resulting from this dendritic segregation.

That the etching process itself is not at fault can be demonstrated by etching pure copper, which will produce masks of the desired degree of uniformity. This would be expected, since pure copper contains only minute traces of impurities to cause dendritic segregation. Pure copper masks are, of course, too soft to be handled and would not be self-supporting when installed in a tube and subjected to the baking-out process.

The degree of dendritic segregation of nickel in copper-nickel alloys can be predicted from consideration of the constitutional diagram. The solidus and liquidus lines of this system are so located that nearly a constant amount of dendritic segregation would be expected in the range from 30% down to about 10% nickel. Below 10% nickel, the amount of dendritic segregation would progressively decrease, but would be significant even in alloys containing only about 2% nickel.

Accepting the conclusion that because of dendritic segregation of nickel the cupro-nickels could not be used for the production of aperture masks of the required uniformity, the color television tube industry turned to materials that appeared more homogeneous in the etching process. Mild steel and special glasses, in particular, were carefully investigated, despite the obvious shortcomings (residual magnetism and outgassing difficulties with the steel, and fragility and etching problems with the glass) that had made them appear unpromising in the initial survey of materials. Little or no practical success was had with these materials, however, and the 70/30 cupro-nickel continued to be used commercially despite the unsatisfactory nature of the black-and-white images obtained with aperture masks made of this material.

I have discovered that dendritic segregation of nickel is not the only factor influencing the uniformity of etching of aperture masks made from copper-nickel alloys, and that, in fact, copper-nickel alloys containing 2% to 8% nickel (all per cent figures given herein are by weight) may be made into aperture masks having an unexpected high degree of uniformity of hole size and shape. These low nickel alloys when fabricated by standard commercial procedures to the thin strip necessary for aperture mask construction, show under the microscope, as predicted, a definite and even substantial amount of residual dendritic segregation. Nonetheless, I have discovered that they behave in the ferric chloride etching solutions used to produce the pattern of holes on a mask as though they were homogeneous materials, and the etching is substantially, if not perfectly, uniform.

Based on this discovery, the invention provides a mask, such as an aperture mask for a color television picture receiving (cathode ray) tube, comprising a thin metal sheet having etched therein a multiplicity of very small closely spaced apertures, said apertures being precisely positioned relative to one another and having accurately formed outlines of predetermined shape and size, said metal sheet being an alloy consisting essentially of 2% to 8% by weight of nickel and the balance copper. The low-nickel cupro-nickel used in making aperture masks according to the invention possesses all the desirable properties of the 70/30 cupro-nickel alloy, including adequate ductility to be dished into desired domed forms without distortion of the hole spacing or deformation of the hole outlines, and the strength required to be self-supporting in the tube assembly. It is nonmagnetic and can be produced commercially in a form free from all objectionable impurities. It is readily produced on a commercial scale in wide widths and thin gauges, it can be assembled in tube mounts by conventional procedures, and it can be outgassed readily and effectively. And the apertures formed in it by conventional photoengraving and etching techniques have such accuracy of position, size and shape that aperture masks according to the invention give excellent color images, and also clear unmottled black-and-white images, when used in color television picture tubes.

A possible explanation for the successful use of low-nickel cupro-nickels in making aperture masks according to this invention, despite the dendritic segregation of the nickel, is that aperture outline and spacing is influenced to a major extent by impurities that are also dendritically segregated. It is thought that carbon may be the most important of these impurities. The higher nickel alloys, because of higher melting point and greater solubility for carbon and other impurities, absorb more of these impurities during melting and casting than do alloys of lower nickel content, and it is the dendritic segregation of the impurity content, as well as the nickel, that is responsible for non-uniform etching behavior of the higher nickel content alloys. Whether or not this explanation is correct, it is a fact that an alloy containing as much as about 8% nickel, when fabricated to thin strip by commercial processes, will show almost perfect uniformity of etching behavior.

While the uniformity of etching of cupro-nickels of higher nickel content might be improved (if the foregoing explanation is correct) by special melting techniques (vacuum or inert gas melting) to avoid the absorption of carbon and other impurities, such techniques are expensive, and in addition the base cost of the alloy increases with increasing nickel content. Considering these economic factors, together with the fact that all the cupro-nickels from about 2 to 30% nickel should be satisfactory with respect to the other requirements of this application, the most practical cupro-nickel for aperture masks is an alloy of the lowest nickel content that will have adequate strength and creep resistance at elevated temperatures.

The strength and creep resistance required at the relatively high temperatures to which a mask is subjected in tube manufacturing and in service are difficult to determine, because of the variable conditions to which the mask may be subjected. The size of the mask is also an important factor. It has been established, by the successful manufacture and use of several thousand "19 inch" and "21 inch" color television receiving tubes, that a mask made from cupro-nickel containing 5 to 7% nickel will give satisfactory results. Masks for smaller tubes can be made from cupro-nickel containing as little as 2% nickel. Cupro-nickel alloys in the range of 2 to 8% nickel may therefore be used for aperture mask construction with the preferred composition for masks of the currently popular size ("21 inch" tube) lying in the narrower range of 5 to 7% nickel. With a nickel content below 2%, the uniformity of etching is excellent, but the strength of the alloy at elevated temperatures is inadequate; while with the stronger alloys containing more than about 8% nickel, the uniformity of etching deteriorates to an undesired extent.

In common with the other cupro-nickels of commerce, these alloys should contain manganese in the range of 0.05 to 0.8% to ensure satisfactory casting behavior and ductility, and magnesium or other deoxidizer in the range from .001 to .01% to ensure complete deoxidation. It has been established that neither manganese nor magnesium in these relatively small amounts has an appreciable effect on the uniformity of etching of the finished strip. Accordingly, in defining the cupro-nickel as consisting, or being composed, essentially of 2 to 8% by weight of nickel, and the balance copper, it is intended that the alloy may also include these substances, as well as impurities normally present. No deliberate additions of iron should be made to these alloys, since amounts of iron in excess of the solubility limit will definitely segregate dendritically and promote non-uniform etching in the photoengraving process.

While the above description of this invention refers to aperture masks having round holes, as in current commercial practice, it is not intended that this invention be limited thereto. Rectangular rather than round apertures have certain advantages and are undergoing experimental development, especially in connection with single-gun tubes. The present invention provides a material suitable for precise perforation by photoengraving techniques, and the shape or size of the apertures produced is immaterial. While the aperture mask is an important product for which the alloy of this invention is uniquely suited, it is intended that any precisely perforated structure prepared by photoengraving techniques shall be a suitable use falling within the scope of this invention.

I claim:

1. A mask comprising a thin metal sheet having etched therein a multiplicity of very small closely spaced apertures, said apertures being characterized by being precisely positioned relative to one another and having accurately formed outlines of predetermined shape and size, said metal sheet being an alloy consisting essentially of 2% to 8% by weight of nickel and the balance copper.

2. A mask comprising a thin metallic sheet composed essentially of 5% to 7% by weight of nickel and the balance copper, said sheet being perforated by a multiplicity of etched apertures which are characterized by having predetermined accurate closely spaced positions relative to one another and accurately formed outlines of predetermined shape and size.

3. An aperture mask for a color television picture tube comprising a thin metallic sheet composed essentially of 2% to 8% by weight of nickel and the balance copper, said sheet being perforated by a multiplicity of closely spaced etched apertures accurately disposed in a predetermined pattern and having accurately formed outlines of predetermined shape and size.

4. An aperture mask for a color television picture tube comprising a thin metallic sheet composed essentially of about 5% to about 7% by weight of nickel and the balance copper, said sheet being perforated by a multiplicity of closely spaced etched apertures accurately disposed in a predetermined pattern and having accurately formed outlines of predetermined size and shape, said perforated mask being pressed into a dished form without distortion of the relative position of said apertures or deformation of the outline thereof.

References Cited in the file of this patent

UNITED STATES PATENTS

| | | |
|---|---|---|
| 2,625,734 | Law | Jan. 20, 1953 |
| 2,659,026 | Epstein | Nov. 10, 1953 |